United States Patent

[11] 3,601,536

[72] Inventor Richard W. Calfee
San Jose, Calif.
[21] Appl. No. 791,419
[22] Filed Jan. 15, 1969
[45] Patented Aug. 24, 1971
[73] Assignee International Business Machines Corporation
Armonk, N.Y.

[54] SYSTEM AND METHOD FOR DEVELOPING A COMPOSITE VIDEO SIGNAL
5 Claims, 3 Drawing Figs.

[52] U.S. Cl. ........ 178/69.5TV, 178/6.6 A, 178/7.2
[51] Int. Cl. ........ H04n 5/04
[50] Field of Search ........ 178/69.5 F, 69.5 TV, 7.2, 6.6 A, 6.6 DD

[56] References Cited
UNITED STATES PATENTS

| | | | |
|---|---|---|---|
| 2,204,427 | 6/1940 | Moller | 178/7.7 |
| 3,483,318 | 12/1969 | Iwai et al. | 178/69.5 (F) |
| 3,488,433 | 1/1970 | Iwai et al. | 178/69.5 (F) |
| 3,493,675 | 2/1970 | Iwai et al. | 178/69.5 (F) |

*Primary Examiner*—Robert L. Griffin
*Assistant Examiner*—Richard P. Lange
*Attorneys*—Hanifin and Jancin and Vincent W. Cleary ABSTRACT: A system whereby a composite video signal is developed by a vidicon camera tube which is driven off a clock track from a rotating magnetic disk. The synchronizing signals from this composite signal are removed and inverted to signals within the same amplitude range as the analog video signal, and combined with the analog video signal. This new composite video signal with inverted sync frequency modulates a carrier which is applied to a rotating disk. Upon readout, this frequency-modulated signal is demodulated and the inverted sync is removed. Conventional sync time replaces the inverted sync.

*INVENTOR.*
RICHARD W. CALFEE

*BY* Vincent W. Cleary

ATTORNEY

SYSTEM AND METHOD FOR DEVELOPING A COMPOSITE VIDEO SIGNAL

BACKGROUND OF THE INVENTION

1. Field of the Invention

This invention relates to a novel system and method for developing composite video signals.

2. Description of the Prior Art

The synchronizing signals of a conventional composite video signal require additional channel bandwidth over and above the analog video portion of the signal. Efforts have been made in the past to reduce this bandwidth by passing the synchronizing signals through a low pass filter. This reduces the bandwidth; however, it also reduces the signal-to-noise ratio of the synchronizing by degrading the signal.

SUMMARY OF THE INVENTION

It is an object of this invention to provide a new and improved system and method for developing a composite video signal.

A further object of the invention is the provision of a system and method for developing a composite video signal requiring a relatively narrow bandwidth.

A still further object of the invention is to provide a new and improved method and system for developing a composite video signal in which the synchronizing signals have a relatively high signal-to-noise ratio.

Still another object of the invention is to obtain a system and a method for developing composite video signals characterized by synchronizing signals having a relatively high signal-to-noise ratio for a given bandwidth.

The above objects of the invention are realized by a system and a method wherein video signals are developed within a predetermined amplitude range. Synchronizing signals are also developed within this same amplitude range. Both of these signals are then combined to produce a composite signal which varies as a function of the video signal and the synchronizing signal so that both of these signals are within the same amplitude range. As a result of this, the bandwidth required for storing this signal is reduced by roughly 30 percent, yet maintains the same signal-to-noise ratio as a comparable conventional composite video signal. Alternatively, the same bandwidth could be used, thereby realizing an improvement in the signal-to-noise ratio of the signal.

GENERAL DESCRIPTION

Figure 1:
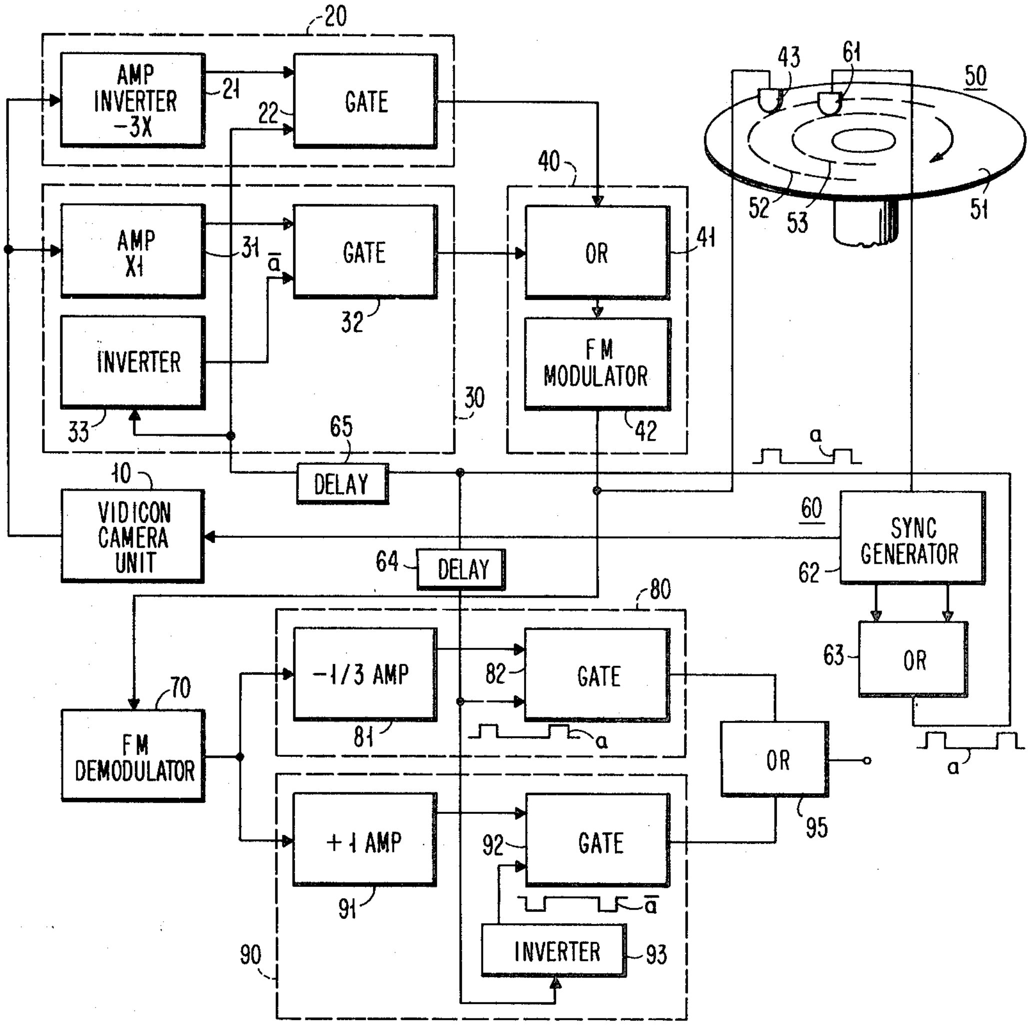
FIG. 1 illustrates a schematic diagram in block form of an embodiment of the invention.

A conventional composite video signal is developed by the vidicon camera unit 10. A channel 20 produces the synchronizing signals from this composite signal, which are inverted and amplified by a factor of three. Channel 30 produces the analog video portion (no sync) of this composite signal from camera unit 10 which, is then combined with the inverted synchronizing signals from channel 20 in a combining unit 40. This produces a composite signal with the video portion and sync portion in the same amplitude range. This combined signal is then applied to a regenerating storage unit 50, such as a disk 51, in some suitable form, such as by frequency modulation so that both the video and sync portions are in the same frequency range. The readout of the vidicon camera unit 10 is effected by a clock track on the disk 51 which clock track is utilized to develop synchronizing signals in the sync system 60 which, in turn, are utilized to readout or drive the vidicon unit 10.

The composite video signal on the storage unit 50 is read out through an FM demodulator 70 to produce the analog composite video signal with inverted sync. A channel 80 provides an output as a result of the inverted sync which inverts the inverted sync and reduces its amplitude by a factor of three. Channel 90 produces the analog portion of the signal by removing the inverted sync which is then combined with the sync developed in channel 80, in OR unit 95.

Figure 2:
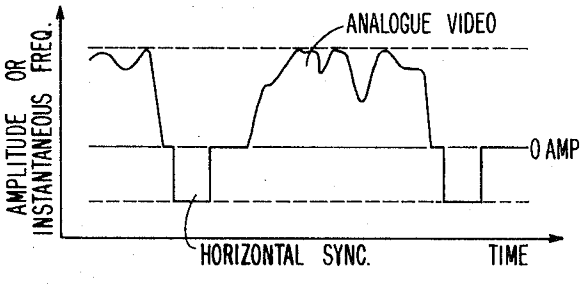
FIG. 2 illustrates a graph of a conventional composite video signal.
Figure 3:
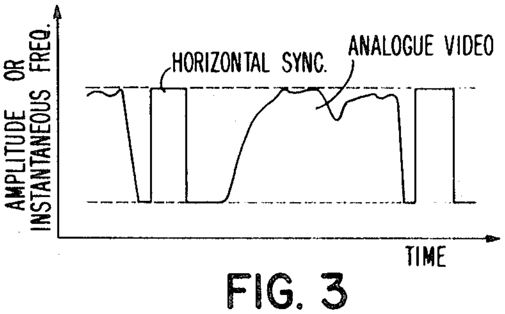
FIG. 3 illustrates the composite video signal developed by the embodiment of the invention illustrated in FIG. 1.

By storing the synchronizing signals in inverted form, such as shown in FIG. 3, the frequency range of the synchronizing signals is the same as the frequency range of the analog video signal. Consequently, it can be seen that the bandwidth required on the magnetic disk 51 is reduced 30 percent over the bandwidth required of a conventional video signal shown in FIG. 2.

DETAILED DESCRIPTION

The vidicon camera 10 provides a conventional composite video signal to channels 20 and 30. The vidicon camera is driven by the synchronizing system 60. Sync system 60 is supplied with a predetermined number of pulses from the clock track 53 on disk 51. These clock pulses are read out by a magnetic head 61 and supplied to a sync generator. The head 61 reads in pulses to develop track 53 by a pulse source, not shown. Preferably, the number of pulses on this track, when divided down, by the sync generator 62 will produce conventionally 525 horizontal sync pulses and two vertical sync pulses. Thus, the sync generator 62 operates in the same manner as is done for developing sync pulses for a conventional television camera. An example would be that the clock track may contain 6,300 pulses, with the output being divided by 12 to produce 525 horizontal drive pulses, and divided by 3,150 to produce two vertical drive sync pulses. The rotary speed of disk 51 is preferably 1,800 r.p.m. so that each rotation of the disk takes the time normally used or elapsed for recording or playing back of one video frame (two interlaced video fields). It will be understood, however, that for the instant invention, rather than a disk recording one video field, a conventional tape recorder could be utilized with clock tracks to produce video signals of as many video fields as desired. The embodiment in FIG. 1 illustrates the recording of one video field, by way of example only.

The sync generator 62 develops the composite sync signals; more specifically, the horizontal and the vertical drive, illustrated as *a*, as well as the vertical blanking and the horizontal blanking signals. As previously stated, this generator 62 applies all four of these signals to unit 10, so as to read out or drive the vidicon tube in a conventional fashion and also to develop the composite sync for the output of unit 10. Unit 10 is connected to channels 20 and 30. The composite video signal from 10, such as illustrated in FIG. 2, is applied to amplifier inverter 21, which first amplifies the composite signal by a factor of three, and also then inverts this signal. The output of the amplifier 21 is applied to a gate 22 that has another input which applies both horizontal and vertical drive sync signals from generator 62 through OR gate 63, delay 65, and then to gate 22. Gate 22 is an analog-type gate which is turned on or opened only by the presence of the horizontal or vertical sync signals from generator 62. The signal passed by the presence of these sync signals, however, is only the output of the amplifier 21. Thus, delay 65 is of such a value that when sync drive signals (a) are generated by 62 and present at the input of gate 22, the output of gate 22 will be the composite sync signals (with no analog video) coming from vidicon camera 10 inverted and amplified by a factor of three. This output is applied to the summing network 40 and, more specifically, to an OR gate 41.

Channel 30 includes an amplifier 31, with a gain of one, which receives the composite video signal from camera unit 10 and applies it to a gate 32. The other inputs of the gate 32 are the horizontal and vertical drive signals, *a* from generator 62, delayed for a predetermined time by delay 65, inverted by inverter 33 (ā) and then applied to gate 32. Gate 32 is an analog-type gate similar to gate 22 and, since the sync signals, such as the horizontal drive signals shown as *a* are inverted (shown as ā), and then applied to gate 32, gate 32 will pass the signals from amplifier 31 only when there are no inverted sync signals ā present at the other input of gate 32. Delay 65 is such a value that gate 32 has an output that is the analog video signals with horizontal and vertical blanking but without sync signals. This analog gate output 32 is also applied to the OR unit 41, where it is added to the inverted sync from gate 62 so as to produce a composite video signal such as shown in FIG. 3. This new composite signal is then applied to the FM modulator 42 and thence to a recording head 43, which records the composite video signal with inverted sync on a track 52 of disk 51.

In the analog composite video fed to modulator 42, the amplitude range of the vertical and horizontal sync signals is the same as the amplitude range of the video portion. This is shown in FIG. 3 which plots amplitude vs. time of the signal. After this signal modulates the carrier of modulator 42, the result is also shown in FIG. 3, which additionally also represents a graph for plotting instantaneous frequency of the signal vs. time. In such a case, the frequency ranges of the sync signal portion and the video portion are the same.

By way of example, the video track 52 can be read out by head 43 and demodulated by FM demodulator 70. Thus, demodulator 70 produces the same signal as present at the output of OR gate 41 (FIG. 3), which signal is applied to channels 80 and 90.

Channel 80 includes an inverter amplifier 81 which inverts this composite signal and amplifies the signal by one-third; that is, inverter-amplifier 81 divides the composite signal by three and applies this reduced inverted signal to gate 82. Gate 82, as well as gate 92, are the same analog type AND gates as gates 22 and 32. The sync signals, *a*, from generator 62, are applied through a delay 64 to gate 82 so as to pass signals through gate 82 from amplifier 81 only when there are sync signals present at the input of gate 82. Thus, the output of gate 82 includes sync signals such as the sync signals illustrated in the composite video signal shown in FIG. 2. This is effected since delay 64, if necessary, and any other such suitable delays, are made of such a value that the sync signals from 62 arrive at gate 82 in substantial coincidence with the sync signals from amplifier 81. Thus, only the sync signals from amplifier 81 pass through gate 82, omitting the video and blanking portions of the output of amplifier 81. These sync signals are applied to OR gate 95.

The composite analog video signal from demodulator 70 is also applied to amplifier 91, which does not invert the signal and has an amplification factor of one. The output of amplifier 91 is applied to gate 92. The OR gate 63 applies the sync signals *a* from generator 62 through delay 64 to the inverter 93 for producing inverted signals ā. The gate 92 passes the signal from amplifier 91, when inverted sync signals from inverter 93 are not present at the input of gate 92. Delay 64 is such a value that the output of gate 92 is the conventional analog video signals with blanking, but without the inverted sync. The output of gate 92 is then added with the sync signals from gate 82 and OR gate 95 to thereby produce once again the conventional composite video signal such as illustrated in FIG. 2 which was generated by camera unit 10.

OPERATION OF THE INVENTION

FIG. 2 illustrates a conventional video signal either in terms of amplitude or instantaneous frequency, when it is put in frequency modulated form as is convention for video recording. It can be seen that approximately one-third of the total bandwidth is required for the sync signal. FIG. 3 illustrates amplitude or instantaneous frequency of the composite signal of the present invention utilizing inverted sync. It can be seen from this that the amplitude of the sync can be increased, thereby increasing the signal-to-noise ratio of the sync, while, at the same time, and/or if desired, lowering the bandwidth substantially. Hence, it will be seen that, if the waveform of FIG. 2 is the output of the vidicon camera 10, the bandwidth for recording can be reduced approximately 35 percent.

The output of the camera tube 10 is applied to the amplifier 21, which is an inverter, and has a gain of three. Gate 22 applies only to inverted sync signals from amplifier 21 to OR gate 41, and gate 32 applies only the analog video signal with horizontal and vertical blanking, but without sync signals, to OR gate 41. This signal is summed in OR gate 41 to produce the composite video signal, such as shown in FIG. 3 with inverted sync. It will be noted from FIG. 3 that due to the amplification of amplifier 21, the amplitude of the sync pulse is considerably increased without increasing the bandwidth required by the video. More specifically, the amplitude of the sync pulses is within the same range of values of amplitude as the analog video signal. Thus, when this signal modulates, FM modulator 42 is applied to track 52, and the sync signals such as the horizontal sync signals shown in FIG. 3, will be in the same frequency range as the analog video signals. This is contrasted to the conventional composite video signals shown in FIG. 2 herein, wherein the original amplitude range of the sync signals is not within the amplitude range of the video signal. Consequently, when in an FM form, the frequency range of the sync signal is outside or added to the frequency range of the analog video signal. It will be obvious from this that this will greatly increase the storage capacity of the disk and requires a far smaller bandwidth channel or storage medium.

The composite, inverted sync, video signal shown in FIG. 3 can be read, by some suitable switching not shown, out of the same head 43 and FM demodulated by demodulator 70. Thus, the output of demodulator 70 is the same composite signal as is present at the output of OR gate 41. In channel 80, this signal is inverted and reduced by a factor of three by amplifier 81, with gate 82 passing to OR gate 90 only the sync signals from amplifier 81. In channel 90, gate 92 passes to OR gate 95 only the analog video with horizontal and vertical blanking from amplifier 91 (without sync signals) to OR gate 90. Thus, at the output of OR gate 95, the composite video signal originally generated by camera unit 10 will be reproduced. This signal can then be applied to a conventional television monitor.

Thus it is seen that, by only a minimum of hardware, the bandwidth requirements for storing the video signal which, in many cases, is very difficult to achieve, is greatly reduced. Furthermore, with a minimum of hardware, this inverted sync video signal is easily inverted to the original conventional composite video signal for use in any desired fashion.

As stated above, the generator 62 provides vidicon unit 10 with horizontal and vertical drive signals, as well as horizontal and vertical blanking. In a conventional manner, these drive signals drive the vidicon camera tube in unit 10. In addition, these drive signals, along with the horizontal and vertical blanking signals, operate on the output of the vidicon tube to produce a composite video signal output. This is as done conventionally. Generator 62 produces these horizontal and vertical drive signals at the same time as it generates the horizontal and vertical drive signals that are applied to OR gate 63. Delays 64 and 65 are shown only to illustrate that some timing compensation may be necessary so that the drive signals (a) from OR gate 63 will be in coincidence with the corresponding inverted drive or sync signals (from 21) at the input of gate 22, and in coincidence with the corresponding drive or sync signals (from amplifier 81) at gate 82. For the same reason, such compensation may be necessary so that the inverted drive signal (ā) from gate 63 will be in coincidence with the corresponding drive or sync signals (from 33) at the input to gate 32 and in coincidence with the corresponding inverted drive or sync signals (from 91) at the input of gate 92. To accomplish this, depending on system delays, it may be necessary to position delays 64 and 65 in different positions, or it may be necessary to add additional delays.

Preferably, a single video form (2 video fields) is recorded of one complete track on disk 51 during one revolution of disk 51. This can be done in various ways, such as a switch at the input of head 43 that opened for only one revolution of disk 51. Such a switch could be triggered by the vertical sync pulse from 62 or by a home pulse on a track on disk 51. Similarly, a home pulse of disk a track on 51, or the vertical sync could be used to read out only one video frame from the vidicon tube of unit 10.

While in accordance with the Patent Statutes I have described what at present is considered to be a preferred embodiment of this invention, it will be obvious to those skilled in the art that various changes or modifications may be made therein without departing from the present invention.

I claim:

1. A method of developing composite video signals requiring a relatively narrow bandwidth, said method including the steps of:

generating an analog video signal having an information portion disposed within a predetermined amplitude range, generating synchronizing signals disposed entirely within said predetermined amplitude range to synchronize said analog video signal, developing from said analog video signal and said synchronizing signals a composite signal which varies as a function of said analog video signal and said synchronizing signal so that both of said last mentioned signals are within the same amplitude range, and frequency modulating said developed composite signal to provide a composite video signal having a frequency which varies as a function of said analog video signal and said synchronizing signal, with said video signal and synchronizing signal being within the same frequency range.

2. A method as set forth in claim 1 including the additional steps of storing said composite signal;

demodulating said frequency-modulated composite signal to produce a demodulated composite video signal having an analog video signal portion that varies within a predetermined amplitude range and a synchronizing portion that varies within the same amplitude range; and converting the demodulated composite video signal into a signal having the video portion varying in one amplitude range and the synchronizing portion within another amplitude range.

3. A system for developing a composite video signal requiring a relatively narrow bandwidth, said system comprising:

a source of conventional composite video signal, first generator means connected to said source for producing an analog video signal having an information portion which occupies a predetermined amplitude range, second generator means connected to said source for producing a synchronizing signal having an amplitude range entirely within said predetermined amplitude range of the analog video signal, combining means connected to said first and second generator means for producing a developed composite video signal which varies as a function of said analog video signal and said synchronizing signal so that said analog video and synchronizing signals are both within the same amplitude range, said developed composite video signal having a frequency which varies as a function of said analog video signal and said synchronizing signal, and means connected to said combining means for frequency modulating said developed composite video signal to provide a composite video signal having a frequency which varies as a function of said analog video signal and said synchronizing signal, said analog video and synchronizing signals being within the same frequency range.

4. A system as set forth in claim 3 including:

means for storing said frequency-modulated composite video signal, means for reading out said frequency-modulated composite video signal from said storage means;

means for demodulating said frequency-modulated composite video signal to produce a demodulated output video signal having first portions with amplitudes varying as a function of said analog video signal and second portions with amplitudes varying as a function of said synchronizing signal; and means for converting said demodulated signal to a composite video signal having its analog video information in one amplitude range and the synchronizing signal in another amplitude range.

5. A system for developing a composite video signal requiring a relatively narrow bandwidth, said system comprising:

a vidicon camera unit for providing a source of conventional composite video signal;

a synchronizing means connected to said camera unit for driving said unit;

first generator means including an amplifier, inverter and a gate, connected to said source for producing an analog video signal having an information portion disposed in a predetermined amplitude range;

second generator means including an amplifier, inverter and a gate, connected to said source for producing a synchronizing signal having an amplitude range disposed entirely within said predetermined amplitude range of the analog video signal;

an OR gate connected to the outputs of said first and second generator means for producing a developed composite video signal which varies as a function of the analog video signal and the synchronizing signal so that the analog video and the synchronizing signals are both within the same amplitude range;

a frequency modulator connected to the output of said OR gate for frequency modulating the developed composite video signal to obtain a composite video signal having a frequency which varies as a function of the analog video signal and the synchronizing signal, which analog and synchronizing signals are within the same frequency range; and regenerating storage means including a recording head connected to the output of said frequency modulator, for recording the composite video signal with inverted synchronization on the video track of a disk-type storage medium.